(12) United States Patent
Kasahara et al.

(10) Patent No.: US 7,043,018 B1
(45) Date of Patent: May 9, 2006

(54) PRIME NUMBER GENERATION METHOD, PRIME NUMBER GENERATION APPARATUS, AND CRYPTOGRAPHIC SYSTEM

(75) Inventors: Masao Kasahara, 15-3, Aogein 4-chome, Minoo-shi, Osaka (JP); Yoshizo Sato, Kyoto (JP); Yasuyuki Murakami, Uji (JP)

(73) Assignees: Murata Kikai Kabushiki Kaisha, Kyoto (JP); Masao Kasahara, Osaka (JP)

( * ) Notice: Subject to any disclaimer, the term of this patent is extended or adjusted under 35 U.S.C. 154(b) by 0 days.

(21) Appl. No.: 09/448,728

(22) Filed: Nov. 24, 1999

(30) Foreign Application Priority Data

Nov. 27, 1998 (JP) .................................. 10-338188

(51) Int. Cl.
*H04L 9/08* (2006.01)
(52) U.S. Cl. ........................... 380/44; 380/30; 380/44; 380/46; 380/277; 708/200; 708/250
(58) Field of Classification Search ................. 380/44, 380/30, 46, 277; 708/200, 250
See application file for complete search history.

(56) References Cited

U.S. PATENT DOCUMENTS

| | | | | |
|---|---|---|---|---|
| 4,351,982 | A * | 9/1982 | Miller et al. ................... | 380/30 |
| 5,159,632 | A * | 10/1992 | Crandall ........................ | 380/28 |
| 5,351,297 | A * | 9/1994 | Miyaji et al. .................. | 380/28 |
| 5,497,423 | A * | 3/1996 | Miyaji ........................... | 380/30 |
| 6,411,715 | B1 * | 6/2002 | Liskov et al. ................ | 380/277 |

FOREIGN PATENT DOCUMENTS

| | | |
|---|---|---|
| JP | 02-037383 | 2/1990 |
| JP | 09-073269 | 3/1997 |
| JP | 10-207363 | 8/1998 |
| JP | 11-052852 | 2/1999 |
| JP | 11-052853 | 2/1999 |

OTHER PUBLICATIONS

J. Gordon, "Strong primes are easy to find," in Eurocrypt □□'84[30], pp. 215-223.*
Vanstone Scott A., Oorschot Paul C. van, Menezes, Alfred J. (1997) Handbook of Applied Cryptography, CRC Press.*
Sato, et al., "Note on the Composite Numbers Invulnerable to the P-1 Method", Jan. 28-31, 1998, SCIS'98 the 1998 Symposium on Cryptography and Information Security.

(Continued)

*Primary Examiner*—Ayaz Sheikh
*Assistant Examiner*—Taghi T. Arani
(74) *Attorney, Agent, or Firm*—Hogan & Hartson, LLP

(57) ABSTRACT

A prime number generation method for efficiently generating prime numbers that are highly resistant to the P−1 and P+1 methods. These prime numbers are used in a cryptosystem. Prime candidates are first generated, and the generated prime candidates are subjected to prime number judgment by either a probabilistic primality testing method or a deterministic primality testing method. A prime candidate P' is generated using odd random numbers, a judgment is made as to whether or not that prime candidate P' satisfies the expression $P' \equiv 0, \pm 1 \pmod{p_i}$ (where $3 \leq i \leq n$) for prime numbers from $p_3$ to $p_n$ (where $p_n$ is the n'th prime). When that expression is satisfied, that prime candidate P' is excluded. Only those prime candidates P' that do not satisfy that condition are subjected to the prime number judgment.

4 Claims, 6 Drawing Sheets

OTHER PUBLICATIONS

Ueli M. Maurer, "Fast Generation of Secure RSA-Moduli with Almost Maximal Diversity", Institute for Signal and Information Processing Swiss Federal Institute of Technology, pp. 636-637, 1998.

Ueli M. Maurer, "Fast Generation of Prime Numbers and Secure Public-Key Cryptographic Parameters" Institute for Theoretical Computer Science, ETH Zurich, Sep. 2, 1991, pp. 123-145.

* cited by examiner

PRIME NUMBER GENERATION METHOD, PRIME NUMBER GENERATION APPARATUS, AND CRYPTOGRAPHIC SYSTEM

BACKGROUND OF THE INVENTION

1. Field of the Invention

This invention relates to a method and apparatus for generating prime numbers used in cryptographic systems, and to a cryptographic system wherein the prime numbers generated are used.

2. Description of the Related Art

In today's world, characterized by sophisticated information utilization, important business documents and image information are transmitted and communicated in the form of electronic information over an infrastructure of computer networks. By its very nature, electronic information can be easily copied, making it extremely difficult to distinguish between the copy and the original, and information security has become a very serious problem. The realization of computer networks which support "shared computer resources," "multi-access," and "broad-area implementation" is particularly indispensable to the establishment of a high-level information society. However, that very realization involves aspects which are inconsistent with the security of information exchanged between authorized parties. An effective technique for eliminating that inconsistency is encryption technology, which up until now, in the course of human history, has been primarily used in the fields of military operations and foreign diplomacy.

Cryptography is the process of converting information so that its meaning cannot be understood by anyone other than the authorized parties. In cryptographic operations, the conversion of the original text (plaintext) that anyone can understand to text (ciphertext), the meaning of which cannot be understood by a third party, is called encryption, and the restoration of that cipher text to plaintext is called decryption. The overall system wherein this encryption and decryption are performed is called a cryptosystem. In the processes of encryption and decryption, respectively, secret information called encryption keys and decryption keys is employed. A secret decryption key is necessary at the time of decryption, and a party knowledgeable of that decryption key can decrypt the cipher text. In this manner, the confidentiality of the information is maintained by the encryption.

The encryption key and decryption key may be the same or they may be different. A cryptosystem wherein both keys are the same is called a common key cryptosystem, and the DES (Data Encryption Standards) adopted by the Bureau of Standards of the U.S. Department of Commerce is a typical example thereof. Cryptosystems called public key cryptosystems have been proposed which are examples of cryptosystems wherein the two keys used are different. With such a public key cryptosystem, the users employing the cryptosystem each produce a pair of keys, that is, an encryption key and a decryption key. The encryption key is disclosed in a public key list, and only the decryption key is kept secret. A characteristic of a public key cryptosystem is that, since the encryption key and the decryption key in the pair are different, the decryption key can be derived from the encryption key using a one-way function.

The public key cryptosystem is a revolutionary cryptosystem wherewith the encryption key is disclosed, and the three factors necessary to the establishment of a high-level information society noted earlier are satisfied. Much research has been done in the interest of utilizing such cryptosystems in such fields as information communications technology, and the RSA cryptosystem has been proposed as a typical public key cryptosystem. This RSA cryptosystem is predicated on the difficulty of factoring prime numbers with one-way functions (prime factor problem). Various techniques (E1 Gamal cryptosystem, etc.) have also been proposed for public key cryptosystems predicated on the difficulty of solving discrete logarithms.

Many modern cryptosystems have been employed which use the prime factor problem or discrete logarithm problem noted above. Therefore, how to handle prime numbers is extremely important in constructing a cryptosystem. Specifically, there is a pressing need to develop techniques for quickly and efficiently generating integers that are true prime numbers.

In general, when generating prime numbers, a prime candidate is first generated, a judgment is then rendered as to whether or not the generated prime candidate is a prime number (prime number judgment), and a candidate thus judged to be a prime number is generated as a prime number.

A standard method of generating prime candidates for prime number judgment is the trial division method. In the trial division method, odd numbers are randomly generated. Then an examination is performed to determine whether or not the generated odd numbers are evenly divisible by the prime numbers equal to or less than a given prime number B, in order from the smaller prime number (i.e. in the order of 3, 5, 7, . . . , B). Those odd numbers which are not evenly divisible by any of the prime numbers equal to or less than a given prime number B are deemed to be prime candidates.

The methods for prime number judgment include probabilistic primality testing methods such as the Rabin method and deterministic primality testing methods such as the Pocklington method. Comparing the probabilistic primality testing methods with the deterministic primality testing methods, the former do not provide a judgment error rate of zero, but the processing time is short, while the latter involve a long processing time but do provide a judgment error rate of zero.

Now, when prime numbers are used in cryptosystems that employ the prime factoring problem, such as the RSA cryptosystem, for example, it is of course desirable that the prime numbers used be such as will be highly resistant to attack by prime factoring methods. Among the typical prime factoring methods which are known are the P−1 method and the P+1 method. The P−1 method is an attack method wherewith it is relatively easy to prime factor a number N, using a prime number solution algorithm, in cases where N=PQ (where P and Q are primes), and P−1 is formed only from the product of small primes. Similarly, the P+1 method is an attack method wherewith it is relatively easy to prime factor a number N, using a prime number solution algorithm, in cases where N=PQ (where P and Q are primes), and P+1 is formed only from the product of small primes.

Thus it is crucial to be able to efficiently generate prime numbers that are highly resistant to attack by the P−1 and P+1 methods (known collectively as the P±1 method), particularly in cases where the prime numbers generated are used in a cryptosystem. With the conventional prime number generation methods described earlier, however, prime candidates are generated randomly without thought to the question of attack resistance. Hence there is a problem that such generation methods cannot efficiently generate prime numbers that are highly resistant to the P±1 method.

SUMMARY OF THE INVENTION with the foregoing in view, it is an object of the present invention to provide a prime number generation method and apparatus for efficiently generating prime numbers that are strongly resistant to the P±1 method, and a cryptosystem that uses those efficiently generated prime numbers.

According to a first aspect of the present invention, there is provided a method for generating prime numbers used in a cryptosystem, including the step of generating, as prime candidates, numbers that do not leave a remainder of 1 when divided by some or all prime numbers equal to or less than a given prime number, and the step of judging whether or not the generated prime candidates are prime numbers.

According to a second aspect of the present invention, there is provided a method for generating prime numbers used in a cryptosystem, including the step of generating, as prime candidates, numbers that do not leave a remainder of −1 when divided by some or all prime numbers equal to or less than a given prime number, and the step of judging whether or not the generated prime candidates are prime numbers.

According to a third aspect of the present invention, there is provided a method for generating prime numbers used in a cryptosystem, wherein: prime candidates are generated; the generated prime candidates are subjected to prime number judgment; and a number A for which the following equation (A) holds true for a prime number p that is equal to or less than a given prime number is excluded from the prime candidates prior to prime number judgment.

$$A \equiv 1 (mod\ p) \quad (A)$$

According to a fourth aspect of the present invention, there is provided a method for generating prime numbers used in a cryptosystem, wherein: prime candidates are generated; the generated prime candidates are subjected to prime number judgment; and a number A for which the following equation (B) holds true for a prime number p that is equal to or less than a given prime number is excluded from the prime candidates prior to prime number judgment.

$$A \equiv -1 (mod\ p) \quad (B)$$

According to a fifth aspect of the present invention, there is provided a method for generating prime numbers used in a cryptosystem, wherein: prime candidates are generated; the generated prime candidates are subjected to prime number judgment; and a number A for which the following equation (C) holds true for a prime number p that is equal to or less than a given prime number is excluded from the prime candidates prior to prime number judgment.

$$A \equiv 0, \pm 1 (mod\ p) \quad (C)$$

According to a sixth aspect of the present invention, there is provided a method for generating prime numbers used in a cryptosystem, including the step of generating a prime candidate P' using odd random numbers, the step of determining whether P'+1 and P'−1 are multiples of 8 or multiples of 9, the step of performing division operations on that prime candidate P' with the prime numbers from $p_3$ to $p_n$ (where $p_n$ is the n'th prime) when neither P'+1 nor P'−1 is a multiple of 8 or 9, and the step of subjecting the prime candidate P' to prime number judgment when, as a result of the division operations, the following equation (D) holds true.

$$P' \not\equiv 0, \pm 1 (mod\ p_i) \quad (D)$$

where i is an integer such that $3 \leq i \leq n$

According to a seventh aspect of the present invention, there is provided a method for generating prime numbers used in a cryptosystem, including the steps of: generating a prime candidate P' using odd random numbers; performing division operations on that prime candidate P' with the prime numbers from $p_1$ to $p_n$ (where $p_n$ is the n'th prime); and subjecting the prime candidate P' to prime number judgment when the following equation (E) holds true for $p_i$ such that $p_i < p_m$ (where i is an integer such that $3 \leq i \leq n$, and m is a given integer such that $3 < m < n$) and the following equation (F) holds true for $p_i$ such that $p_i > p_m$.

$$P' \not\equiv 0 (mod\ p_i) \quad (E)$$

$$P' \not\equiv 0, \pm 1 (mod\ p_i) \quad (F)$$

According to an eighth aspect of the present invention, there is an apparatus for generating prime numbers used in a cryptosystem, including: means for generating, as prime candidates, numbers which are not evenly divisible by prime numbers that are equal to or less than a given prime number but are equal to or greater than 5, and for which the remainder of such division is neither 1 nor −1; and means for judging whether or not the generated prime candidates are prime numbers.

According to a ninth aspect of the present invention, there is provided a cryptosystem that includes an encryptor for converting plaintext to ciphertext using an encryption key, and a decryptor for converting the ciphertext back to the plaintext using a decryption key, and prime numbers which are generated by a method according to the above described first to seventh aspects of the invention are used in the encryption key and/or in the decryption key.

In the present invention, after odd numbers have been randomly generated, the generated odd numbers are examined to determine whether or not they can be evenly divided by small prime numbers. When they can be evenly divided, they are not made prime candidates, but neither are they made prime candidates when the remainder of such division is 1 or −1. Each odd number generated is subjected to such process using all prime numbers that are both equal to or less than a given prime number and equal to or greater than 5. Odd numbers which are both such that they cannot be evenly divided by any of those prime numbers and such that the remainder of such division is neither 1 nor −1 are generated as prime candidates. The prime candidates thus generated are subjected to prime number judgment and prime numbers are obtained. Accordingly, prime candidates which cannot be prime numbers that are strongly resistant to the P±1 method are eliminated in the prime number generation stage, prior to prime number judgment. Therefore, time that would be wasted in useless prime number judgment is saved, and prime numbers that are highly resistant to the P±1 method are generated very efficiently.

DETAILED DESCRIPTION OF THE INVENTION

The present invention is now described specifically with reference to the accompanying drawings which represent embodiments thereof.

Figure 1:
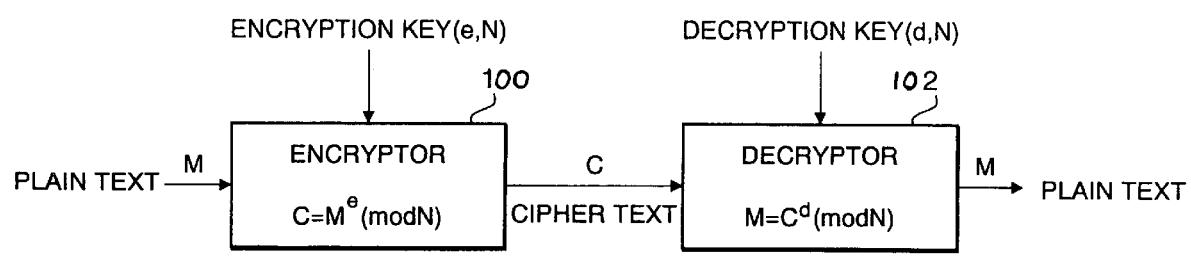
FIG. 1 illustrates a model diagram of the structure of an RSA cryptosystem.

Referring to FIG. 1, illustrated is one example of a cryptosystem according to the present invention. In FIG. 1 is diagrammed the configuration of an RSA cryptosystem which is a public key cryptosystem as described earlier. An encryptor 100 uses an encryption key (e, N) to encrypt plaintext M to produce ciphertext C, and a decryptor 102 uses a decryption key (d, N) to decrypt the ciphertext C back to the plain text M.

Figure 2:
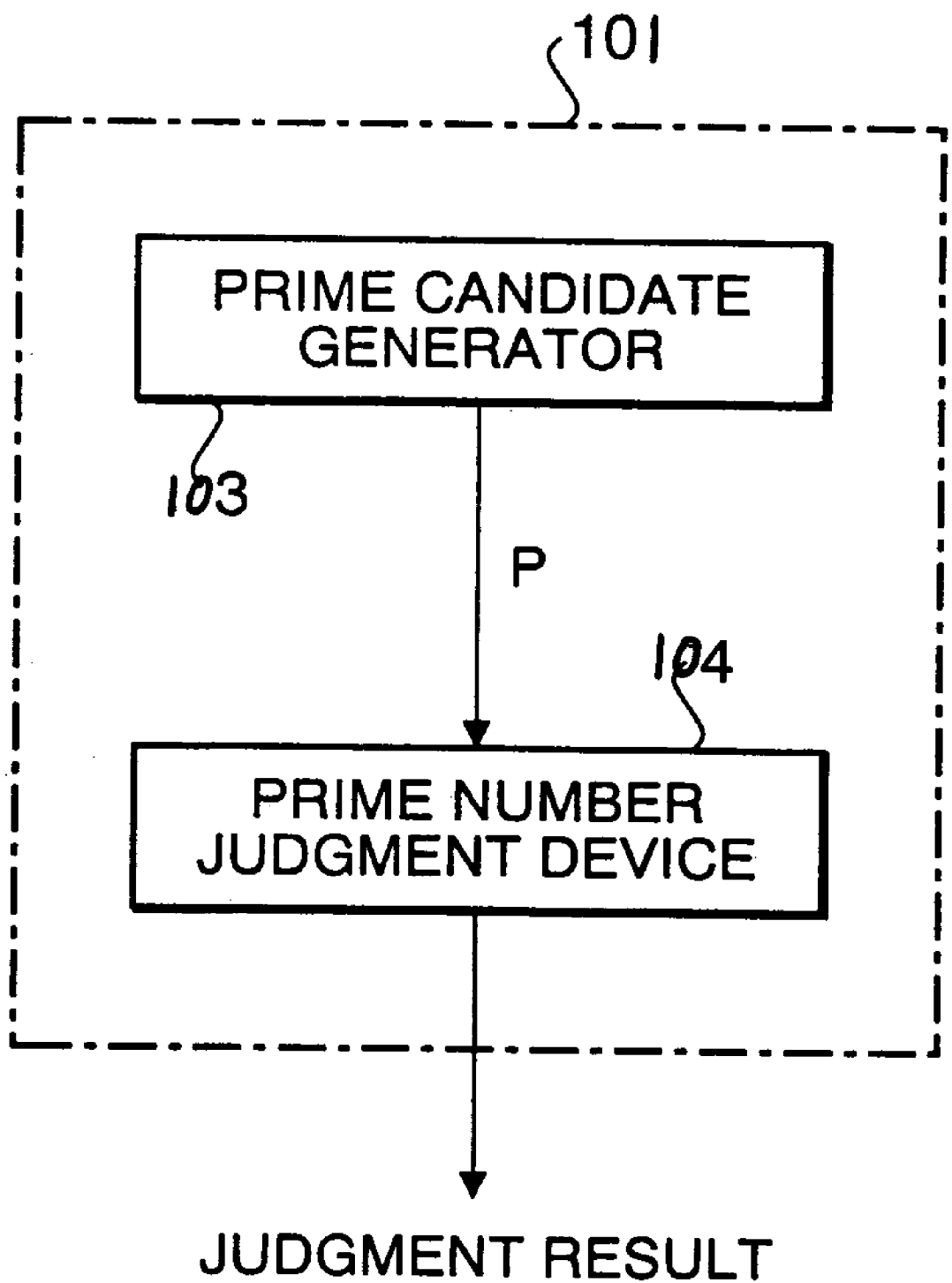
FIG. 2 illustrates a configuration diagram of the prime number generation apparatus according to the present invention.

Here, the algorithm for the encryption E and the decryption D is expressed as follows, using a power operation over modulo calculation.

$$C=E(M)=M^e (mod\ N)$$

$$M=D(C)=C^d (mod\ N)$$

where $e \cdot d \equiv 1\ (mod\ lcm\ (p-1,\ q-1))$,

N=P·Q (where P and Q are large primes), e, N is a public key, d is a secret key, and lcm is the least common multiple Referring to FIG. 2, illustrated is a configuration of a prime number generation apparatus according to the present invention which efficiently generates prime numbers (P, Q), and which are highly resistant to the P±1 method, for use in an RSA cryptosystem such as diagrammed in FIG. 1, for example. The prime number generation apparatus 101 has a prime candidate generator 103 for generating prime candidates P' by a probabilistic primality testing method or a deterministic primality testing method and outputting the judgment results.

Figure 3:
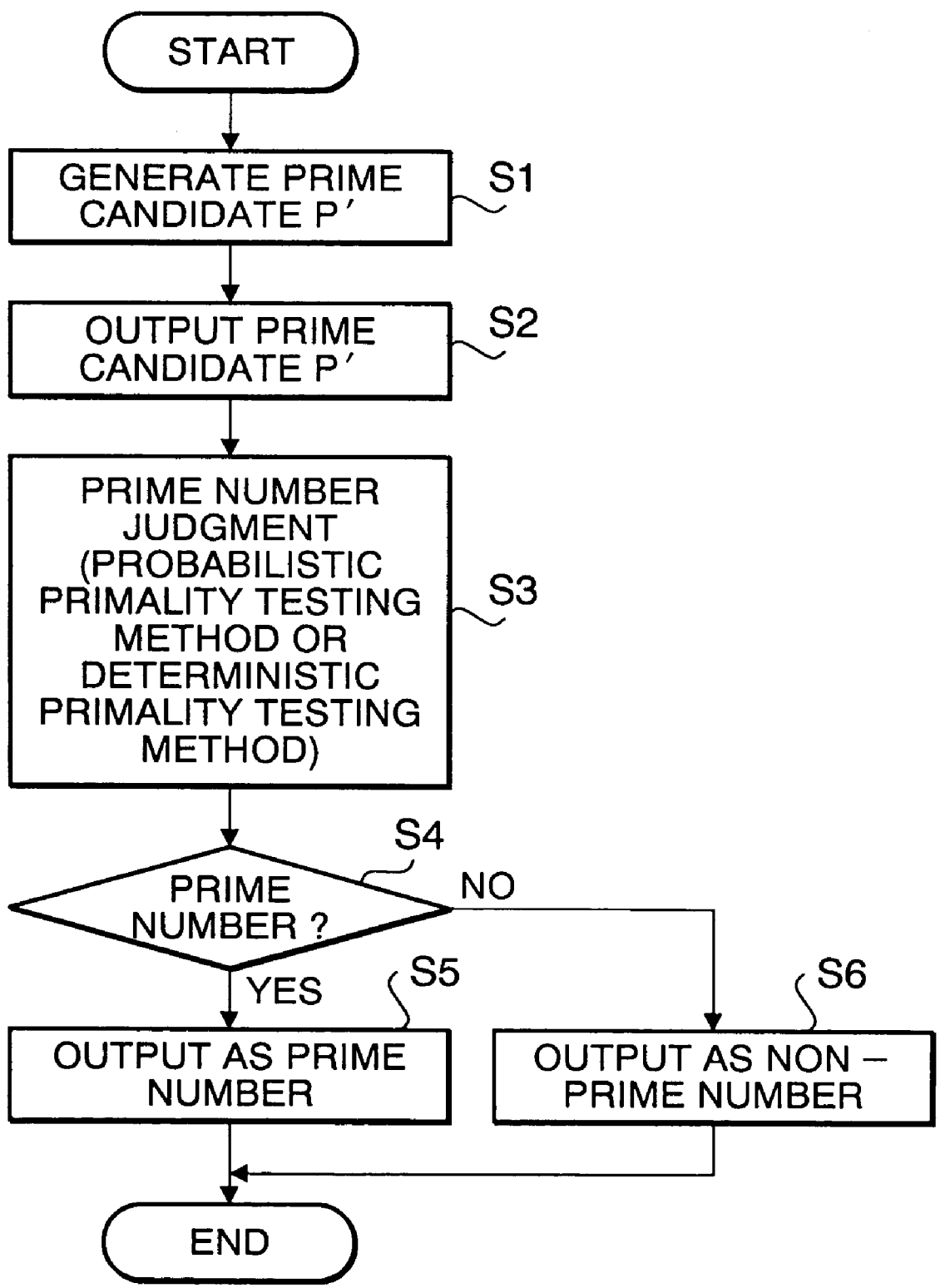
FIG. 3 is a flowchart of an operational procedure for generating prime numbers in the present invention.

FIG. 3 shows a flowchart of an operational procedure for generating those prime numbers. The prime candidate generator 103 generates a prime candidate P' according to a scheme that will be described below (step S1), and outputs the generated prime candidate P' to the prime number judgment device 104 (step S2). The prime number judgment device 104 judges whether or not the input prime number P' is a prime number, based on either the probabilistic primality testing method or the deterministic primality testing method (step S3). As a result of that judgment, when the candidate is found to be a prime number (yes in S4), that prime candidate P' is output as a prime number (step S5), and when it is found not to be a prime number (NO in S4) that prime candidate P' is output as a non-prime number (step S6).

In the process described above, the method of generating the prime numbers P' is a characteristic of the present invention. By not generating prime candidates P' that cannot be prime numbers which are highly resistant to the P±1 method, and generating only prime candidates P' that can be prime numbers which are highly resistant to the P±1 method, the present invention is able to efficiently generate prime numbers which are highly resistant to the P±1 method. A conventional judgment method can be used for prime number judgment so that such a method needs no further description here.

The method of generating prime numbers which is a characteristic feature of the present invention is now described in detail. The following definitions, which apply in the descriptions of the present invention, are given first.

Definition 1: M is defined as a set of prime numbers.

Definition 2: $p_n$ is defined as the n'th prime number.

Definition 3: The probability of a generated prime candidate becoming a prime number is defined as the prime number generation rate.

Theorem 1 (fundamental prime number theorem):

The number $\pi(x)$ of prime numbers $p_i$ which satisfy $p_i \leq x$ is approximated by the following formula (1).

$$\pi(x) \simeq \frac{x}{\log x}\ (x \to \infty) \qquad (1)$$

The probability that a prime candidate P' generated using odd random numbers can be roughly estimated as in the following formula (2).

$$Prob(P' \in M) \simeq \prod_{\substack{p_i \geq 3 \\ p_i \leq \sqrt{P'}}} \left(1 - \frac{1}{p_i}\right) \qquad (2)$$

It is difficult to calculate the probability of a large prime candidate P' being a prime number using formula (2) given above. That being so, when the prime candidate P' is n-bit number, using theorem 1, the following formula (3) is used for the formula (2) approximation.

$$Prob(P' \in M) \simeq 2 \cdot \frac{\pi(2^n) - \pi(2^{n-1})}{2^n - 2^{n-1}} \qquad (3)$$

In order for a prime number P to be a prime number that is highly resistant to the P±1 method, it is necessary that P±1 contain a large prime factor. The following index function is defined for evaluating the resistance to the P±1 method.

Definition 4 (index function):

The function F(P) expressed by the following formula (4) wherein P−1 and P+1 are multiplied together is defined as the index function.

$$F(P)=(P-1)(P+1) \qquad (4)$$

For a prime number P, P−1 and P+1 are successive even numbers. Therefore, one of these numbers will be a multiple of 4 and the other will be a multiple of 2. Furthermore, because P−1, P, and P+1 are three successive numbers and P is not a multiple of 3, either P−1 or P+1 will also be a multiple of 3. Accordingly, for any prime number P, 24|F(P) is established. Thus the prime number P that is most resistant to the P±1 method (most resistant prime) can be defined as follows.

Definition 5 (most resistant prime):

For a prime number P, assume that $p_-$ and $p_+$ are prime factors of P−1 and P+1, respectively. The prime number for which the index function is represented by the formula (5) below is defined as the most resistant prime.

$$F(P)=24 \cdot p_- \cdot p_+ \qquad (5)$$

Definition 6:

The set of most resistant prime numbers is defined as $M_{best}$. When prime candidates P' are generated using odd random numbers, the most resistant prime number production rate "Prob" (P' $\in M_{best}$) can be estimated as in formula (6) below.

$$\text{Prob}(P' \in M_{best}) = \frac{2}{9} \prod_{\substack{p_i \geq 5 \\ p_i < \sqrt{P'}}} \left(1 - \frac{3}{p_i}\right) \qquad (6)$$

By considering the probabilities with which P' and the index function for P', namely F(P'), can be evenly divided by prime numbers $p_i$ equal to or less than $P'^{1/2}$, formula (6) is derived.

(i) Case where $p_i = 2$

Since P'−1 and P'+1 are successive even numbers, formula (7) is satisfied. Formula (8) is also established, and, since P' is an odd number, estimation is possible as in Formula (9).

$$\text{Prob}(4 \nmid F(P')) = 0 \qquad (7)$$

$$\text{Prob}(8 \nmid F(P')) = \text{Prob}(P' \not\equiv 1, 7 (\text{mod } 8)) \qquad (8)$$

$$\text{Prob}(8 \nmid F(P')) = \frac{1}{2} \qquad (9)$$

(ii) Case where $p_i = 3$

Since P'−1, P', and P'+1 are three successive numbers, formula (10) is satisfied. Formula (11) is also established. Therefore, estimation is possible as in formula (12).

$$\text{Prob}(3 \nmid P' \wedge 3 \nmid F(P')) = 0 \qquad (10)$$

$$\text{Prob}(3 \nmid P' \wedge 9 \nmid F(P')) = \text{Prob}(P' \not\equiv 0, 1, 3, 6, 8 (\text{mod } 9)) \qquad (11)$$

$$\text{Prob}(3 \nmid P' \wedge 9 \nmid F(P')) = \frac{4}{9} \qquad (12)$$

(iii) Case where $p_i \geq 5$

Formula (13) below is satisfied. Also, since P' mod $p_i$ takes on the values $0, 1, \ldots, p_i - 1$ with equal frequency, formula (14) is established.

$$\text{Prob}(p_i \nmid P' \wedge p_i \nmid F(P')) = \text{Prob}(P' \not\equiv 1, 0, p_i - 1 (\text{mod } p_i)) \qquad (13)$$

$$\text{Prob}(p_i \nmid P' \wedge p_i \nmid F(P')) = 1 - \frac{3}{p_i} \qquad (14)$$

Accordingly, from the foregoing, the most resistant prime number generation rate can be estimated with formula (6) given earlier.

For large prime candidates P', it is very difficult to solve formula (6). Formula (6) is therefore modified and formula (3) is used in making approximations to derive the most resistant prime number generation rate.

In general, formula (15) below is established, and therefore formula (6) can be modified as in formula (16) below.

$$\left(1 - \frac{3}{p_i}\right) = \left(1 - \frac{1}{p_i}\right)\left(1 - \frac{1}{p_i - 1}\right)\left(1 - \frac{1}{p_i - 2}\right) \qquad (15)$$

$$\text{Prob}(P' \in M_{best}) = \frac{2}{9} \prod_{i=3}^{n} \left(1 - \frac{1}{p_i}\right)\left(1 - \frac{1}{p_i - 1}\right)\left(1 - \frac{1}{p_i - 2}\right) \qquad (16)$$

$$= \alpha_n^2 \cdot \beta_n \cdot \frac{2}{9} \prod_{i=3}^{n} \left(1 - \frac{1}{p_i}\right)^3$$

Here, the maximum i that will satisfy $p_i < P'^{1/2}$ is taken as n, and $\alpha_n$ and $\beta_n$ are assumed to satisfy formulas (17) and (18) below respectively.

$$\alpha_n = \prod_{i=3}^{n} \frac{\left(1 - \frac{1}{p_i - 1}\right)}{\left(1 - \frac{1}{p_i}\right)} = \prod_{i=3}^{n} \left(1 - \frac{1}{(p_i - 1)^2}\right) \qquad (17)$$

$$\beta_n = \prod_{i=3}^{n} \frac{\left(1 - \frac{1}{p_i - 2}\right)}{\left(1 - \frac{1}{p_i - 1}\right)} = \prod_{i=3}^{n} \left(1 - \frac{1}{(p_i - 2)^2}\right) \qquad (18)$$

First, the false position method (regula falsi) is used to show that $\alpha_n$ converges. For any i such that i>2, from the fact that $p_i - p_{i-1} \geq 2$, formula (19) below is clearly established, and formula (20) below is also established.

$$1 - \frac{1}{p_{i-1}^2} < 1 - \frac{1}{(p_i - 1)^2} < 1 - \frac{1}{p_i^2} \qquad (19)$$

$$\prod_{i=k}^{\infty} \left(1 - \frac{1}{p_{i-1}^2}\right) < \prod_{i=k}^{\infty} \left(1 - \frac{1}{(p_i - 1)^2}\right) < \prod_{i=k}^{\infty} \left(1 - \frac{1}{p_i^2}\right) \qquad (20)$$

Here, $s_n$ is established as in formula (21), and, using $\alpha_n$ and formula (21) to rewrite formula (20), formulas (22) and (23) are established.

$$s_n = \prod_{i=3}^{n} \left(1 - \frac{1}{p_i^2}\right) \qquad (21)$$

$$\frac{s_\infty}{s_{k-1}} < \frac{\alpha_\infty}{\alpha_k} < \frac{s_\infty}{s_k} \qquad (22)$$

$$s_\infty \frac{\alpha_k}{s_{k-1}} < \alpha_\infty < s_\infty \frac{\alpha_k}{s_k} \qquad (23)$$

Here, if it should be assumed that $\zeta(\cdot)$ is a zeta function, it is defined by formula (24) below. Using this, from the fact that $\zeta(2) = \pi^2/6$, formula (25) below is established.

$$\zeta(x) = \sum_{n=1}^{\infty} \frac{1}{n^x} = \prod_{i=1}^{\infty} \left(1 - \frac{1}{p_i^x}\right)^{-1} \qquad (24)$$

$$s_\infty = \frac{9}{\pi^2} \qquad (25)$$

In formula (23), moreover, $\alpha_k/s_{k-1}$ increases simply while $\alpha_k/s_k$ decreases simply. Therefore, according to the false position method, $\alpha_n$, as expressed by formula (17), converges.

The ratio between the upper and lower limits is expressed by formula (26). As the value of k is increased, 1 is rapidly approached, and the speed of convergence is very high. As a result of calculating up to k=10,000, for example, with formula (23), a value such as that expressed in formula (27) below is obtained.

$$1 \bigg/ \left(1 - \frac{1}{p_k}\right) \tag{26}$$

$$\alpha_\infty \cong 0.88021575446914 \tag{27}$$

Similarly, for $\beta_n$, the relationship that $p_i - p_{i-1} \geq 2$ is established with any i (i>2). Therefore, formula (28) below is clearly established. As in the case of $\alpha_k$, moreover, the relationship expressed in formula (29) can be derived.

$$1 - \frac{1}{p_{i-1}^2} \leq 1 - \frac{1}{(p_i - 2)^2} < 1 - \frac{1}{p_i^2} \tag{28}$$

$$s_\infty \frac{\beta_k}{s_{k-1}} < \beta_\infty < s_\infty \frac{\beta_k}{s_k} \tag{29}$$

Therefore, $\beta_n$ also converges rapidly, and, as a result of calculating out to k=10,000, for example, with formula (29), a value such as expressed by formula (30) below is obtained.

$$\beta_\infty \cong 0.81980244657585 \tag{30}$$

Accordingly, formula (6) can be approximated by equation (31) below.

$$\text{Prob}(P' \in M_{best}) \simeq 0.14114 \prod_{\substack{p_i \geq 5 \\ p_i < \sqrt{P'}}} \left(1 - \frac{1}{p_i}\right)^3 \tag{31}$$

The most resistant prime numbers, defined as in the foregoing, will be very resistant to the P±1 method, but the number of such prime numbers is small, and they are not always easy to generate. Thus they are not practical. That being so, in cases where a relatively small prime number is useable as the P±1 factor, it is possible to generate prime numbers more easily than it is to generate the most resistant prime numbers, while still maintaining adequate resistance to the P±1 method. The prime numbers that are resistant to the P±1 method (resistant prime numbers) that can be practically generated are now described.

A prime number is defined below wherewith the P±1 factors are comprised only of one large prime number and of one small prime number that is equal to or less than a certain value.

Definition 7 ($p_m$: resistant prime number):

For a prime number P, $p_-$ and $p_+$ are assumed to be prime numbers which are larger than the $p_m$ for P−1 and P+1, respectively. A prime number, of which the index function is given by formula (32), is defined as $p_m$ (resistant prime number).

$$F(P) = 2^{k_1} 3^{k_2} \ldots p_m^{k_m} \cdot p_- \cdot p_+ \tag{32}$$

Definition 8:

The set of $p_m$ (resistant prime numbers) is defined as $M_{better}^{(m)}$. When prime candidates are generated using odd random numbers, the resistant prime number generation rate, in like manner as the most resistant prime number generation rate, can be estimated as in formula (33) below.

$$\text{Prob}(P' \in M_{better}^{(m)}) = \prod_{\substack{p_i \geq 3 \\ p_i \leq p_m}} \left(1 - \frac{1}{p_i}\right) \prod_{\substack{p_i > p_m \\ p_i < \sqrt{P'}}} \left(1 - \frac{3}{p_i}\right) \tag{33}$$

Figure 4:
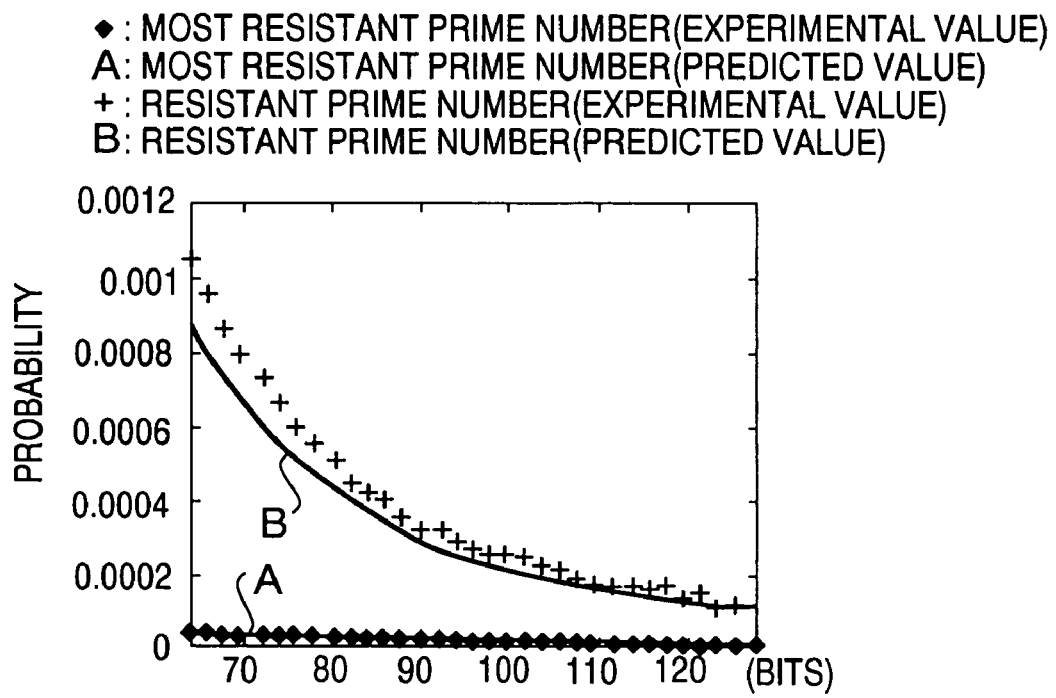
FIG. 4 is a graph plotting the probabilities of a number becoming a resistant prime number or a most resistant prime number (predicted values and experimental values)

Using a computer, 1,000,000 odd random numbers were actually generated every two bits from 64 bits to 128 bits, and the probabilities of those becoming most resistant prime numbers and the probabilities of them becoming $p_9$ (resistant prime numbers) were computed. The measured results are plotted in FIG. 4. Also represented in FIG. 4 are theoretically predicted values calculated according to formulas (6) and (33). The results show that, for the most resistant prime numbers, the predicted values roughly coincide with the experimental values and that, for the $p_9$ (resistant prime numbers) also, the predicted values and the experimental values roughly coincide.

In order for a prime number P to be a most resistant prime number or a resistant prime number, it is necessary that P±1 not contain a small prime factor $p_i$. That is, it is necessary that formula (34) below hold true.

$$P \not\equiv \begin{cases} 1 \\ -1 \end{cases} \pmod{p_i} \tag{34}$$

Accordingly, by performing trial divisions, and eliminating prime candidates which are such that P'≡0, ±1 (mod $p_i$), prior to subjecting the prime candidates P' to prime number judgment, both most resistant prime numbers and resistant prime numbers can be efficiently generated. Such a method of generation is now described in specific terms.

1ST EMBODIMENT

Efficient Generation of Most Resistant Prime Numbers

After generating a prime candidate P' using odd random numbers, and verifying that both P±1 are neither multiples of 8 nor multiples of 9, that P' is subjected to trial divisions with the prime numbers from $p_3$ to $p_n$. When P'≡0, ±1 (mod $p_i$), another prime candidate is generated and the process is re-executed from the beginning. Only those candidates which have passed all of the verifications are subjected to judgment to determine whether or not they are most resistant prime numbers. An algorithm for this first embodiment is indicated below, where oddrandom( ) is an odd random number generation function and isbestprime(P') is a function for subjecting P' to most resistant prime number judgment.

Algorithm for the first embodiment:
LOOP:
P'←oddrandom( );
  if P' mod 8=1 or 7
    then goto LOOP;
  if P' mod 9=0 or 1 or 3 or 6 or 8
    then goto LOOP;
  for i=3 to n do

```
begin
    if P' mod p_i=1 or 0 or p_i-1
        then goto LOOP;
    end
if isbestprime(P')=TRUE
    then print P', exit;
else goto LOOP;
```

In this first embodiment, prime candidates which cannot become most resistant prime numbers are eliminated prior to prime number judgment. Therefore, the time that would be needed for useless prime number judgment is saved, and the most resistant prime numbers can be generated efficiently at high speed.

Figure 5:
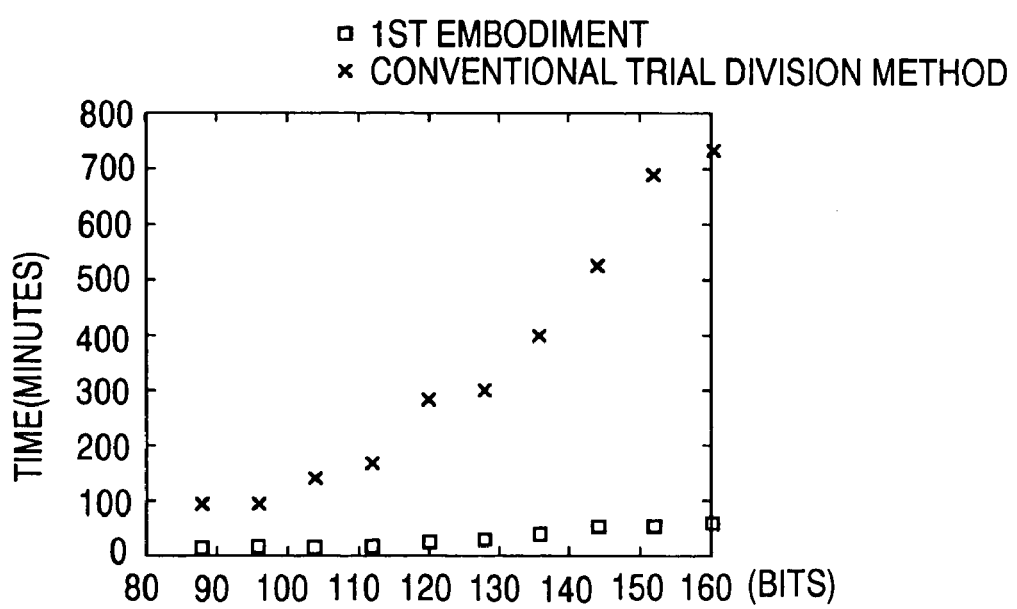
FIG. 5 depicts a graph of the times needed to generate a most resistant prime number in a first embodiment of the invention and in a conventional example.

The times for generating 100 most resistant prime numbers for each 8 bits from 88 bits to 160 bits using this first embodiment and a conventional trial division method were measured. The prime numbers from $p_3$ to $P_{500}$ obtained by both methods were verified by trial division. The results of these measurements are plotted in FIG. 5. For the 120-bit prime numbers, for example, the generation speed indicated was approximately 16 times faster with the first embodiment as with the conventional trial division method. Thus it was found that most resistant prime numbers can be generated with extremely high efficiency with the first embodiment.

2ND EMBODIMENT

Efficient Generation of Resistant Prime Numbers

A prime candidate P' is generated using odd random numbers, and P' is subjected to trial division with prime numbers from $p_i$ to $p_n$. With $p_i$ such that $p_i < p_m$, a prime candidate is regenerated only when P'≡0 (mod $p_i$). For $p_i$ such that $p_i > p_m$, a prime candidate is regenerated when P'≡0, ±1 (mod $p_i$), as in the first embodiment. Only those candidates that pass all of the verifications are subjected to judgment to determine whether or not they are resistant prime numbers. An algorithm for this second embodiment is indicated below, where is better prime(P') is a function for subjecting P' to resistant prime number judgment.

Algorithm for the second embodiment:
```
LOOP:
P'←oddrandom( );
for i=2 to n do
    begin
        if P' mod p_i=0
            then goto LOOP;
        if i>m
            then
                if P' mod p_i=1 or p_i-1
                    then goto LOOP;
    end
    if isbetterprime(P')=TRUE
        then print P', exit;
    else goto LOOP;
```

In this second embodiment, as in the first embodiment, prime candidates which cannot be resistant prime numbers are eliminated prior to prime number judgment. Thus, the time that would be needed for useless prime number judgment is saved, and resistant prime numbers can be generated efficiently at high speed.

Figure 6:
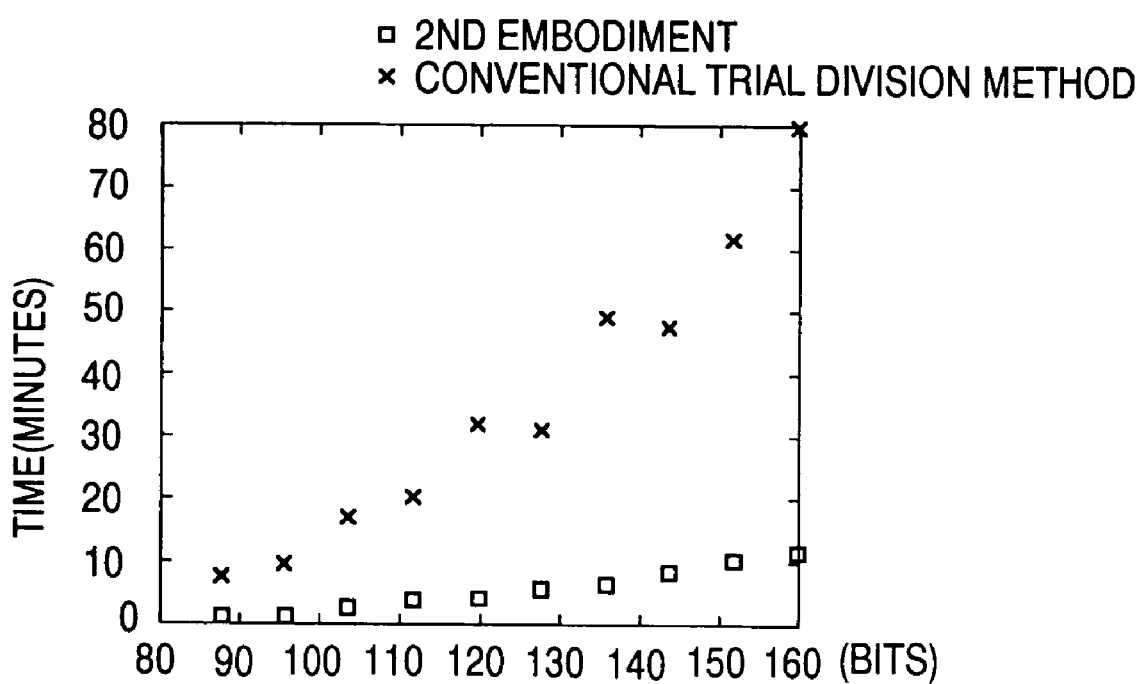
FIG. 6 is a graph of resistant prime number generation times in a second embodiment of the invention and in a conventional example.

The times for generating 100 $p_4$ (resistant prime numbers) for each 8 bits from 88 bits to 160 bits using this second embodiment and a conventional trial division method were measured. The prime numbers from $p_3$ to $P_{500}$ obtained by both methods were verified by trial division. The results of these measurements are plotted in FIG. 6. For the 120-bit prime numbers, for example, the generation speed indicated was approximately 8 times faster with the second embodiment as with the conventional trial division method. Thus it was found that resistant prime numbers can be generated with extremely high efficiency with the second embodiment.

3RD EMBODIMENT

Now it is conceivable that there could be a need to generate, at high speed, prime numbers that are comparatively resistant to the P±1 method, without the need for the degree of resistance afforded by either most resistant prime numbers or resistant prime numbers. In such a case, either the most resistant prime number judgment function isbestprime(P') used in the first embodiment or the resistant prime number judgment function isbetterprime(P') used in the second embodiment is replaced by the prime number judgment function isprime(P'). Then, prime numbers which are more resistant to the P±1 method than prime numbers generated by a conventional trial division method can be generated at very high speed.

Figure 7:
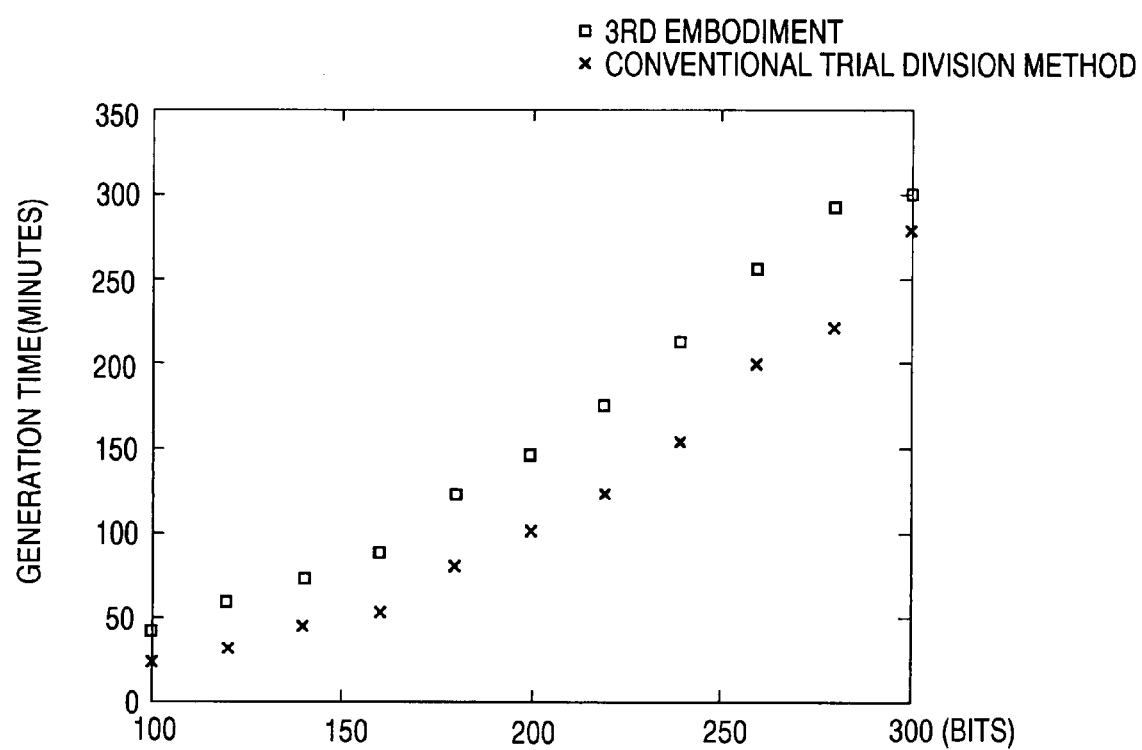
FIG. 7 is a graph of the times required for prime number generation in a third embodiment of the invention and in a conventional example.

FIG. 7 is a graph that plots the times required for generating 1000 prime numbers for each 20 bits from 100 bits to 300 bits, according to a third embodiment and to a conventional trial division method. In FIG. 7, the x marks indicate times required to generate prime numbers using the conventional trial division method. After verifying whether or not even division is possible with each prime number up to the 1000th one, prime number judgment is implemented. In FIG. 7, furthermore, the 0 marks indicate times required for generating prime numbers by the third embodiment. After verifying whether or not even division is possible with each prime number up to the 99th one as conventionally, and verifying each prime number from the 100th to the 1000th one according to the third embodiment, prime number judgment is implemented.

To be sure, the time required for generating prime numbers is longer with the third embodiment than in the conventional example. However, whereas all that is done in the conventional example is simply to generate prime numbers, with the third embodiment, prime numbers can be generated which are comparatively resistant to the P±1 method. When that point is taken into consideration, the degree of increase in generation time involved here is not a problem. Furthermore, the rate of increase in time required for prime number generation with the third embodiment is little different from the conventional example, even when the number of bits becomes large.

In the embodiments described in the foregoing, when an integer yields a remainder of neither 0 nor ±1 when divided by a prime number, that integer is made a prime candidate. However, it is also permissible to make an integer a prime candidate when that integer yields a remainder of 1 when divided by a prime number, and it is further permissible to make an integer a prime candidate when that integer yields a remainder of −1 when divided by a prime number.

With the present invention, as described in the foregoing, prime candidates that cannot be prime numbers which are resistant to the P±1 method are eliminated prior to prime number judgment. Therefore, prime numbers that are resistant to the P±1 method can be generated efficiently. The present invention can therefore contribute to the development of cryptosystems which make use of the prime factor problem and the discrete logarithm problem.

The above described and illustrated method, apparatus and system are disclosed in Japanese Patent Application No. 10-338188 filed Nov. 27, 1998, the present application claims priority of this Japanese Patent Application, and the entire disclosure of the Japanese Patent Application is incorporated herein by reference.

What is claimed is:

1. A computer implemented prime number generation method for generating prime numbers used in a cryptosystem, comprising the steps of:
   generating a plurality of prime candidates P' using odd random numbers;
   selecting prime candidates P' for which neither P'+1 nor P'−1 is a multiple of 8 or 9, wherein the multiple of 8 or 9 is derived from a most resistant prime number in an index function, wherein the index function is defined by F(P')=(P'−1)(P'+1);
   performing division operations on each of the selected prime candidates P' with a subset of prime numbers selected from $p_3$ to $p_n$ (where $p_n$ is n'th prime); and
   subjecting prime candidates P' to prime number judgment when, as a result of said division operations, following equation (D) holds true:

$$P'\not\equiv 0,\pm 1 (mod\ Pi) \qquad (D)$$

(where i is an integer such that $3 \leq i \leq n$).

2. A computer implemented prime number generation method for generating prime numbers used in a cryptosystem, comprising the steps of:
   generating a plurality of prime candidates P' using odd random numbers;
   selecting prime candidates P' for which neither P'+1 nor P'−1 is a multiple of 8 or 9, wherein the multiple of 8 or 9 is derived from a most resistant prime number in an index function, wherein the most resistant prime number is defined by F(P)=24·p−·p+, and wherein p− and p+ are prime factors of P'−1 and P'+1, respectively;
   performing division operations on each of the selected prime candidates P' with a subset of prime numbers selected from $p_3$ to $p_n$ (where $p_n$ is n'th prime); and
   subjecting prime candidates P' to prime number judgment when, as a result of said division operations, following equation (D) holds true;

$$P'\not\equiv 0,\pm 1 (mod\ Pi) \qquad (D)$$

(where i is an integer such that $3 \leq i \leq n$).

3. A computer implemented prime number generation method for generating prime numbers used in a cryptosystem, comprising the steps of:
   generating a plurality of prime candidates P' using odd random numbers;
   performing division operations on each of the plurality of prime candidates P' with a subset of prime numbers selected from $p_1$ to $p_n$ (where $p_n$ is n'th prime); and
   subjecting the prime candidates P' to prime number judgment when following equation (E) holds true for $p_i$ such that $p_i < p_m$ (where i is an integer such that $3 \leq i \leq n$, and m is a given integer such that 3<m<n) and following equation (F) holds true for $p_i$ such that $p_i > p_m$, wherein $p_m$ provides a level to determine a resistant prime candidate P', wherein $p_m$ is a prime number of which an index function is defined by $F(P')=2^k{}_1 3^k{}_2 \cdots p_m{}^k{}_m \cdot p-\cdot p+$, wherein p− and p+ are prime numbers which are larger than $p_m$ for P'−1 and P'+1, respectively:

$$P'\not\equiv 0 (mod\ Pi) \qquad (E)$$

$$P'\not\equiv 0\pm 1 (mod\ Pi) \qquad (F).$$

4. A computer implemented prime number generation method for generating prime numbers used in a cryptosystem, comprising the steps of:
   generating a plurality of prime candidates P' using odd random numbers;
   performing division operations on each of the plurality of prime candidates P' with a subset of prime numbers selected from $p_1$ to $p_n$ (where $p_n$ is n'th prime); and
   subjecting the prime candidates P' to prime number judgment when following equation (E) holds true for $p_i$ such that $p_i < p_m$ (where i is an integer such that $3 \leq i \leq n$, and m is a given integer such that 3<m<n) and following equation (F) holds true for $p_i$ such that $p_i > p_m$, wherein $p_m$ provides a level to determine a resistant prime candidate P', wherein the level provided by $p_m$ is determined with a condition of P'≠#±1;

$$P'\not\equiv 0 (mod\ Pi) \qquad (E)$$

$$P'\not\equiv 0\pm 1 (mod\ Pi) \qquad (F).$$

* * * * *